United States Patent [19]

Gray

[11] Patent Number: 4,855,918

[45] Date of Patent: Aug. 8, 1989

[54] ELECTRONIC VEHICLE SPEED CONTROL SYSTEM HAVING ANALOG AND DIGITAL MEMORY CIRCUITS

[75] Inventor: Larry O. Gray, Laurinburg, N.C.

[73] Assignee: Dana Corporation, Toledo, Ohio

[21] Appl. No.: 901,135

[22] Filed: Aug. 28, 1986

[51] Int. Cl.$^4$ .............................................. B60K 31/00
[52] U.S. Cl. ................................ 364/426.04; 180/179; 123/352
[58] Field of Search .............. 364/565, 426.04, 431.07; 180/170, 176, 178, 179; 123/352

[56] References Cited

U.S. PATENT DOCUMENTS

| | | | |
|---|---|---|---|
| 3,715,006 | 2/1973 | Walsh et al. | 180/176 |
| 3,766,367 | 10/1973 | Sumiyoshi et al. | 180/176 |
| 4,046,213 | 9/1977 | Larson | 364/426.04 |
| 4,337,511 | 6/1982 | Schneider et al. | 180/179 |
| 4,374,422 | 2/1983 | O'Keefe, Jr. et al. | 364/426 |
| 4,467,428 | 8/1984 | Caldwell | 364/426 |
| 4,495,454 | 1/1985 | Collonia | 364/426.04 |
| 4,537,272 | 8/1985 | Tanigawa et al. | 180/176 |
| 4,540,060 | 9/1985 | Kawata et al. | 364/426 |
| 4,650,020 | 3/1987 | Mizuno et al. | 180/176 |

*Primary Examiner*—Gary Chin
*Attorney, Agent, or Firm*—MacMillan, Sobanski & Todd

[57] ABSTRACT

An improved electronic system for automatically maintaining the actual speed of a vehicle at or near a desired speed is disclosed. The system includes means for generating electrical signals representing both the actual and desired speeds of the vehicle. The desired speed signal generating means includes a digital memory circuit and an analog memory circuit. The digital memory circuit and the analog memory circuit are provided to generate and store electrical signals which are representative of the desired speed of the vehicle during different phases of operation of the system. The digital memory circuit is utilized to supply the desired speed signal to the comparison circuit during normal operation of the system. The analog memory circuit is utilized to supply the desired speed signal to the comparison circuit when the resume or accerleration features of the system are activated. The outputs of the digital memory circuit and the analog memory circuit are both connected to a memory buffer circuit. The memory buffer circuit feeds only the lesser one of the desired speed signals stored in the digital and analog memory circuits to a comparison circuit, where it is compared with the actual speed signal. Improved circuits for accomplishing resume and acceleration features are also disclosed.

18 Claims, 4 Drawing Sheets

ELECTRONIC VEHICLE SPEED CONTROL SYSTEM HAVING ANALOG AND DIGITAL MEMORY CIRCUITS

BACKGROUND OF THE INVENTION

The present invention relates in general to vehicle speed control systems and in particular to an improved electronic system for automatically maintaining the actual speed of a vehicle at or near a predetermined desired speed, which system utilizes both analog and digital memory circuits.

Electronic vehicle speed control systems are well known in the art and are generally available most modern vehicles, either as original equipment or as an aftermarket addition. Such speed control systems are provided to automatically maintain the actual speed of the vehicle at or near a predetermined desired speed selected by the vehicle operator. Typically, electrical signals representing the actual and desired speeds of the vehicle are generated by the system and are supplied to a comparison circuit. The comparison circuit determines whether the actual speed of the vehicle is greater than, less than, or approximately equal to the desired speed and generates electrical control signals in accordance therewith. The control signals are fed to an actuating mechanism which is mechanically connected to the vehicle engine throttle. The actuating mechanism automatically regulates the position of the vehicle engine throttle in response to the control signals so as to increase, decrease, or maintain the actual speed of the vehicle. In this manner, the actual speed of the vehicle is maintained at or near the desired speed.

As such electronic vehicle speed control systems have been developed, they have been provided with certain features which provide the vehicle operator with additional ease and flexibility during use. One such feature is commonly referred to as the resume feature. The resume feature is utilized to engage the system to automatically return the actual speed of the vehicle to a prior desired speed after the system has been disengaged for some reason. For example, when a particular desired speed has been set by the vehicle operator and the system is engaged for normal operation, the actual speed of the vehicle will be maintained at or near that desired speed. If the brakes of the vehicle are applied by the operator, however, the system will become disengaged for obvious safety reasons. The resume feature permits the operator to thereafter re-engage the system to automatically return the actual speed of the vehicle to the prior desired speed simply by manipulating a single control switch of the system. Thus, a system offering the resume feature must include some means for storing the value of the prior desired speed when the system is disengaged so that the actual speed can be compared thereto upon activation of the resume feature.

Another feature which is often provided on modern electronic speed control systems is commonly referred to as the acceleration feature. The acceleration feature is utilized to automatically increase the desired speed of the vehicle, and consequently the actual speed thereof, by a predetermined amount. Typically, the predetermined amount of increase is relatively small, usually about one mile per hour. For example, if the vehicle operator has set a particular desired speed for the vehicle and the system is engaged for normal operation, the actual speed of the vehicle will be maintained at or near that desired speed. Thereafter, the vehicle operator may wish to increase the actual speed of the vehicle by a small amount. The acceleration feature permits the vehicle operator to increase the actual speed of the vehicle by a predetermined relatively small amount simply by manipulating a single control switch of the system. The resume and acceleration features are desirable not only because they are convenient, but because they cause less distraction to the driver while the vehicle is in motion.

SUMMARY OF THE INVENTION

The present invention relates to an improved electronic system for automatically maintaining the actual speed of a vehicle at or near a desired speed. The system includes means for generating electrical signals representing both the actual and desired speeds of the vehicle. The desired speed signal generating means includes a digital memory circuit and an analog memory circuit. The digital memory circuit and the analog memory circuit are provided to generate and store electrical signals which are representative of the desired speed of the vehicle during different phases of operation of the system. The digital memory circuit is utilized to supply the desired speed signal to the comparison circuit during normal operation of the system. The analog memory circuit is utilized to supply the desired speed signal to the comparison circuit when the resume or acceleration features of the system are activated. The outputs of the digital memory circuit and the analog memory circuit are both connected to a memory buffer circuit. The memory buffer circuit feeds only the lesser one of the desired speed signals stored in the digital and analog memory circuits to a comparison circuit, where it is compared with the actual speed signal. Improved circuits for accomplishing resume and acceleration features are also disclosed.

It is an object of the present invention to provide an improved electronic system for automatically maintaining the actual speed of the vehicle at or near a predetermined desired speed.

It is another object of the present invention to provide such a system having both analog and digital memory circuits.

It is a further object of the present invention to provide such a system having improved circuitry for accomplishing the resume and acceleration features.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Overview Of The Structure Of The System

Figure 1:
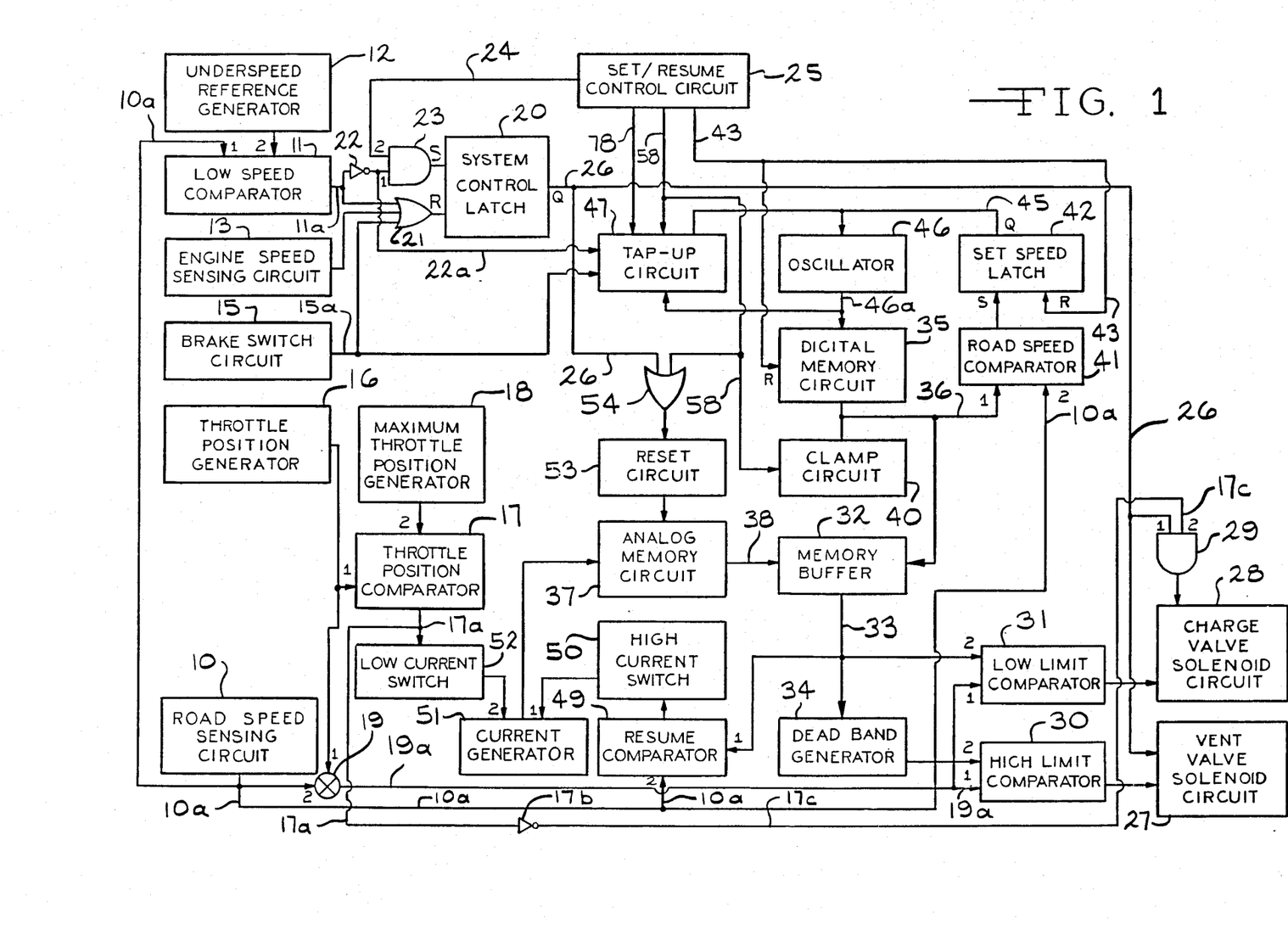
FIG. 1 is a block diagram of an electronic vehicle speed control system in accordance with the present invention.

Referring now to the drawings, there is illustrated in FIG. 1 a block diagram of an electronic vehicle speed control system in accordance with the present invention. The system is adapted to automatically maintain the actual speed of the vehicle at or near a desired speed, which desired speed is predetermined by an operator of the vehicle. In order to do this, the system includes means for generating electrical signals which are representative of both the actual speed of the vehicle and the desired speed thereof. In the illustrated embodiment, the actual speed signal generating means includes a road speed sensing circuit 10. The road speed sensing circuit 10 is conventional in the art and typically includes means responsive to the rotation of one or more of the mechanical components in the vehicle drive train for generating an analog electrical signal which is proportional in magnitude to the rotational speed thereof. Thus, the actual speed signal varies in magnitude with the rotational speed of the drive train components of the vehicle and, therefore, the actual speed of the vehicle. One example of an electrical circuit which may be utilized to form the road speed sensing circuit 10 is disclosed in U.S. Pat. No. 3,946,707 to Gray, owned by the assignee of the present invention. The disclosure of such patent is hereby incorporated by reference.

The output signal of the road speed sensing circuit 10 is fed on an output line 10a to a first input of a low speed comparator 11. A second input of the low speed comparator 11 is connected to the output of an underspeed reference generator 12. The underspeed reference generator 12 generates an analog electrical signal which is representative of a predetermined minimum speed of the vehicle, below which it may be undesirable to engage the vehicle speed control system for operation. As mentioned above, the signal generated by the road speed sensing circuit 10 is representative of the actual speed of the vehicle. Thus, the low speed comparator 11 compares the actual speed signal with the predetermined minimum speed signal and generates a high output signal on an output line 11a when the actual speed of the vehicle falls below the minimum speed. Throughout this description of the invention, it is assumed that the system operates on a positive logic basis. Thus, unless otherwise stated, a high output signal from a comparator or a similar logic device having two stable output states is assumed to be a positive voltage at a predetermined level, while a low output signal is assumed to be a zero or ground voltage. It will be appreciated that many other equivalent circuits, other than those specifically explained and illustrated herein, can be devised which operate under other assumptions but achieve the same purpose, and such circuits are contemplated to be within the scope of the present invention. As will be explained in greater detail below, the high output signal of the low speed comparator 11 is utilized to disengage the system from operation and to prevent re-engagement of the system until the actual speed of the vehicle rises above the predetermined minimum speed.

An engine speed sensing circuit 13 is also included in the electronic vehicle speed control system of the present invention. The engine speed sensing circuit 13 is conventional in the art and typically includes means responsive to the operation of one or more components within the vehicle engine for generating a high output signal when the speed of the engine exceeds a predetermined maximum safe value. The engine speed sensing circuit 13 may also generate a high output signal when the rate of acceleration of the engine speed exceeds a predetermined safe value. One example of an electrical circuit which may be utilized to form the engine speed sensing circuit 13 is disclosed in U.S. Pat. No. 4,495,913 to Gray, owned by the assignee of the present invention. The disclosure of such patent is hereby incorporated by reference. A brake switch circuit 15 is further included in the electronic vehicle speed control system of the present invention. The brake switch circuit 15 is conventional in the art and is adapted to generate a high output signal on an output line 15a when the brakes of the vehicle are operated. As will also be explained in detail below, the high output signals of the engine speed sensing circuit 13 and the brake switch circuit 15 are utilized to disengage the system from operation when either the speed or the rate of acceleration of the engine rise above the predetermined maximum value or when the brakes of the vehicle are operated, respectively, and to prevent re-engagement of the system until such conditions have changed.

A throttle position generator 16 is provided in the electronic vehicle speed control system of the present invention. The throttle position generator 16 is conventional in the art and is described in the above-referenced U.S. Pat. No. 3,946,707. The throttle position generator 16 is adapted to generate an analog electrical signal which is representative the relative position of the throttle valve (not shown) within the vehicle engine. The output signal of the throttle position generator 16 is fed to a first input of a throttle position comparator 17. A second input of the throttle position comparator 17 is connected to a maximum throttle position generator 18. The maximum throttle position generator 18 generates an analog electrical signal which is representative of a predetermined maximum position of the throttle valve, beyond which it may be undesirable for the system to actuate the throttle valve. The maximum throttle position signal need not be a constant value, but rather may vary according to a predetermined schedule based upon various factors, such as the actual speed of the vehicle and the like. The throttle position comparator 17 compares the actual throttle position signal with the predetermined maximum throttle position signal and generates a high output signal on an output line 17a when the actual throttle position exceeds the predetermined maximum throttle position. As will be explained in greater detail below, the high output signal from the throttle position comparator 17 is utilized to prevent the vehicle from accelerating under the influence of the system so as to maintain the actual throttle position below the predetermined maximum position.

The output signal of the throttle position generator 16 is also fed to a first input of a summing junction 19. A second input of the summing junction 19 is connected to the output line 10a of the road speed sensing circuit 10. The summing junction 19 combines the actual speed signal from the road speed sensing circuit 10 with the throttle position signal from the throttle position generator 16 to generate a composite actual speed signal on an output line 19a. The summation of the output signals from the road speed sensing circuit 10 and the throttle position generator 16 provide a feedback loop for the system, for the purposes described in the above-referenced U.S. Pat. No. 3,946,707.

The output signals from the low speed comparator 11, the engine speed sensing circuit 13, and the brake switch circuit 15 are all fed to the reset input of a system control latch 20. The system control latch 20 can be formed of a conventional bistable multivibrator, commonly referred to as a flip-flop. In the illustrated embodiment, a Boolean logic OR gate 21 symbolizes the connection of all of the outputs of the low speed comparator 11, the engine speed sensing circuit 13, and the brake switch circuit 15 to the reset input of the system control latch 20. The structure and function of the OR gate 21 is well known in the art. The OR gate 21 generates a high output signal to the reset input of the system control latch 20 when any one or more of the low speed comparator 11, the engine speed sensing circuit 13, and the brake switch circuit 15 generates a high output signal to one of the inputs thereof. In addition to being connected to one of the inputs of the OR gate 21, the output line 11a of the low speed comparator 11 is also connected through an inverter 22 having an output line 22a to a first input of a Boolean logic AND gate 23. The structure and function of the inverter 22 is well known in the art. The inverter 22 generates a high output signal to the first input of the AND gate 23 when the low speed comparator 11 generates a low output signal to the input thereof, and vice versa. A second input of the AND gate 23 is connected to an output line 24 of a set/resume control circuit 25. The structure and operation of the set/resume control circuit 25 will be explained in greater detail below. The output of the AND gate 23 is connected to the set input of the system control latch 20. The structure and function of the AND gate 23 is also well known in the art. The AND gate 23 generates a high output signal to the set input of the system control latch 20 only when both the inverter 22 and the set/resume control circuit 25 generate high output signals to the respective inputs thereof.

The system control latch 20 is adapted to generate and hold one of two predetermined output signals or states, depending upon the status of the input signals thereto. When neither the AND gate 23 nor the OR gate 21 are generating high output signals to the respective set and reset inputs of the system control latch 20, the output of the system control latch 20 will remain at whichever state it was previously held at. If the AND gate 23 generates a high output signal to the set input and the OR gate 21 does not generate a high output signal to the reset input, the output of the system control latch 20 will be maintained at or changed to (depending upon the prior state) a high output state. If the AND gate 23 does not generate a high output signal to the set input and the OR gate 21 generates a high output signal to the reset input, the output of the system control latch 20 will be maintained at or changed to (depending upon the prior state) a low output state. As will become apparent below, the system is engaged or ready to be engaged for operation when the output state of the system control latch 20 is high and disengaged when the output state of the system control latch 20 is low.

The output of the system control latch 20 is connected to an output line 26. The output line 26 is connected directly to a vent valve solenoid circuit 27 and indirectly to a charge valve solenoid circuit 28. As shown in FIG. 1, the output line 26 is connected to a first input of an AND gate 29. A second input of the AND gate 29 is connected to the output of an inverter 17b by means of a line 17c. The input of the inverter 17b is connected to the output line 17a of the throttle position comparator 17. The vent valve solenoid circuit 27 and the charge valve solenoid circuit 28 are provided to selectively operate respective vent and charge valves (not shown) which mechanically regulate the position of the throttle valve of the vehicle engine. When the output state of the system control latch 20 is low, the vent valve solenoid circuit 27 and the charge valve solenoid circuit 28 are disabled so as to de-energize the vent and charge valves. Thus, the system is disengaged from operation. When the output state of the system control latch 20 is high, the vent valve solenoid circuit 27 is enabled to permit selective energization of the vent valve. When the output state of the system control latch 20 is high, and further when the output state of the throttle position comparator 17 is low, the charge valve solenoid circuit 28 is enabled to permit selective energization of the charge valve. It will thus be appreciated that the charge valve is automatically disabled when the throttle position comparator 17 generates a high output signal, thereby preventing the vehicle from accelerating under the influence of the system.

The operations of the vent valve solenoid circuit 27 and the charge valve solenoid circuit 28 are controlled by a high limit comparator 30 and a low limit comparator 31, which have outputs connected respectively thereto. The high limit comparator 30 and the low limit comparator 31 each have a first input connected to the output line 19a of the summing junction 19. As mentioned above, the summing junction 19 generates an analog electrical signal on the output line 19a which is representative of the composite actual speed of the vehicle. A second input to the low limit comparator 31 is connected directly to the output of a memory buffer circuit 32 by an output line 33. As will be explained in greater detail below, the memory buffer circuit 32 generates an analog electrical signal on the output line 33 which is representative of the desired speed of the vehicle. The output line 33 of the memory buffer circuit 32 is also connected through a dead band generator 34 to a second input of the high limit comparator 30.

The structure and operation of the solenoid circuits 27 and 28, the comparators 30 and 31, and the dead band generator 34 are explained and illustrated in detail in the above-referenced U.S. Pat. No. 3,946,707. Briefly, however, the comparators 30 and 31 compare the composite actual speed signal from the summing junction 19 with the respective signals from the dead band generator 34 and the memory buffer circuit 32, which define the upper and lower limits of a relatively narrow band of desired speeds. If the actual speed of the vehicle is greater than the upper limit of the desired speed band, the vent valve solenoid circuit 27 will open the vent valve and the charge valve solenoid circuit 28 will close the charge valve so as to decrease the vehicle speed. If the actual speed of the vehicle is between the upper and lower limits of the desired speed band, the vent valve solenoid circuit 27 will close the vent valve and the charge valve solenoid circuit 28 will close the charge valve so as to maintain the vehicle speed. If the actual speed of the vehicle is less than the lower limit of the desired speed band, the vent valve solenoid circuit 27 will close the vent valve and the charge valve solenoid circuit 28 will open the charge valve so as to increase the vehicle speed. Notwithstanding the above, however, the charge valve solenoid circuit 28 will be de-energized so as to prevent the opening of the charge valve when the throttle position comparator 17 generates a high output signal, as described above.

The memory buffer circuit 32 has a first input connected to a digital memory circuit 35 by means of an output line 36, and a second input connected to an analog memory circuit 37 by means of an output line 38. The structure and operation of the memory buffer circuit 32, the digital memory circuit 35, and the analog memory circuit 37 are explained and illustrated in detail below. Briefly, however, the memory circuits 35 and 37 are provided to generate analog electrical signals to the memory buffer circuit 32, which signals are representative of the desired speed of the vehicle during different phases of operation of the system. The memory buffer circuit 32 is responsive to the magnitudes of both of the signals from the memory circuits 35 and 37 and feeds only the lesser of the two signals therethrough to the low limit comparator 31 and the dead band generator 34.

A clamp circuit 40 has an output which is connected to the output line 36 of the digital memory circuit 35. The clamp circuit 40 has an input which is connected to the set/resume control circuit 25 by means of an output line 58. The structure and operation of the clamp circuit 40 s also explained and illustrated in detail below. The output line 36 of the digital memory circuit 35 is also connected to a first input of a road speed comparator 41. A second input of the road speed comparator 41 is connected to the output line 10a of the road speed sensing circuit 10. The output of the road speed comparator 41 is connected to the set input of a set speed latch 42. The road speed comparator 41 generates a high output signal to the set input of the set speed latch 42 when the value of the desired speed signal stored in the digital memory circuit 35 is greater than the actual speed signal from the road speed sensing circuit. The reset input of the set speed latch 42 is connected to an output line 43 of the set/resume control circuit 25. The output of the set speed latch 42 is connected by a line 45 to an oscillator 46. A tap-up circuit 47 has an output which is connected to the line 45. The structure and operation of the oscillator 46 and the tap-up circuit 47 are explained and illustrated in detail below. The output from the oscillator 46 is connected by a line 46a to the input of the digital memory circuit 35 and to an input of the tap-up circuit 47. Other inputs of the tap-up circuit 47 are connected to the lines 15a and 22a from the brake switch circuit 15 and the inverter 22, respectively, the output line 58 from the set/resume control circuit 25, and an output line 78 from the set/resume control circuit 78. The digital memory circuit 35 also includes a reset input which is connected to the output line 43 to the set/resume control circuit 25.

The output line 33 of the memory buffer circuit 32 is further connected to a first input of a resume comparator 49. A second input of the resume comparator 49 is connected to the output line 10a of the the road speed sensing circuit 10. The output of the resume comparator 49 is connected to the input of a high current switch 50. The resume comparator 49 compares the actual speed signal with the desired speed signal and generates a high output signal to the high current switch 50 when the actual speed of the vehicle is greater than the desired speed. The output of the high current switch 50 is connected to a first input of a current generator 51 which, in turn, is connected to the input of the analog memory circuit 37. The current generator 51 normally increases the value of the desired speed signal contained in the analog memory circuit 37 at a first predetermined rate. When actuated by the high output signal of the resume comparator 49, however, the high current switch 50 causes the current generator 51 to rapidly increase the value of the desired speed signal contained in the analog memory circuit 37 at a second predetermined rate, substantially greater than the first predetermined rate. Thus, the present invention provides a means for increasing the value of the desired speed signal stored in the analog memory circuit 37 at to different rates.

The current generator 51 has a second input which is connected to the output of a low current switch 52. The low current switch 52 selectively disables the current generator 51 to prevent it from further increasing the value of the desired speed signal contained in the analog memory circuit 37. The low current switch 52 is actuated to disable the current generator 51 by the high output signal from the throttle position comparator 17, which is generated when the position of the throttle valve is greater than the predetermined maximum throttle position, as described above. Thus, when the maximum throttle position is reached, the current generator 51 is disabled so as to prevent the desired speed signal contained in the analog memory circuit 37 from increasing until the throttle position decreases below the predetermined maximum. Lastly, a reset circuit 53 is also connected to the analog memory circuit 37. The reset circuit 53 is provided to selectively reset the desired speed signal contained in the analog memory circuit 37 to zero. The input of the reset circuit 53 is connected by means of an OR gate 54 to both the output line 26 of the system control latch 20 and to the output line 58 of the set/resume control circuit 25 for actuation by either. The structure and operation of the resume comparator 49, the high current switch 50, the current generator 51, the low current switch 52, and the reset circuit 53 will be explained in greater detail below.

The Set/Resume Control Circuit 25

Figure 2:
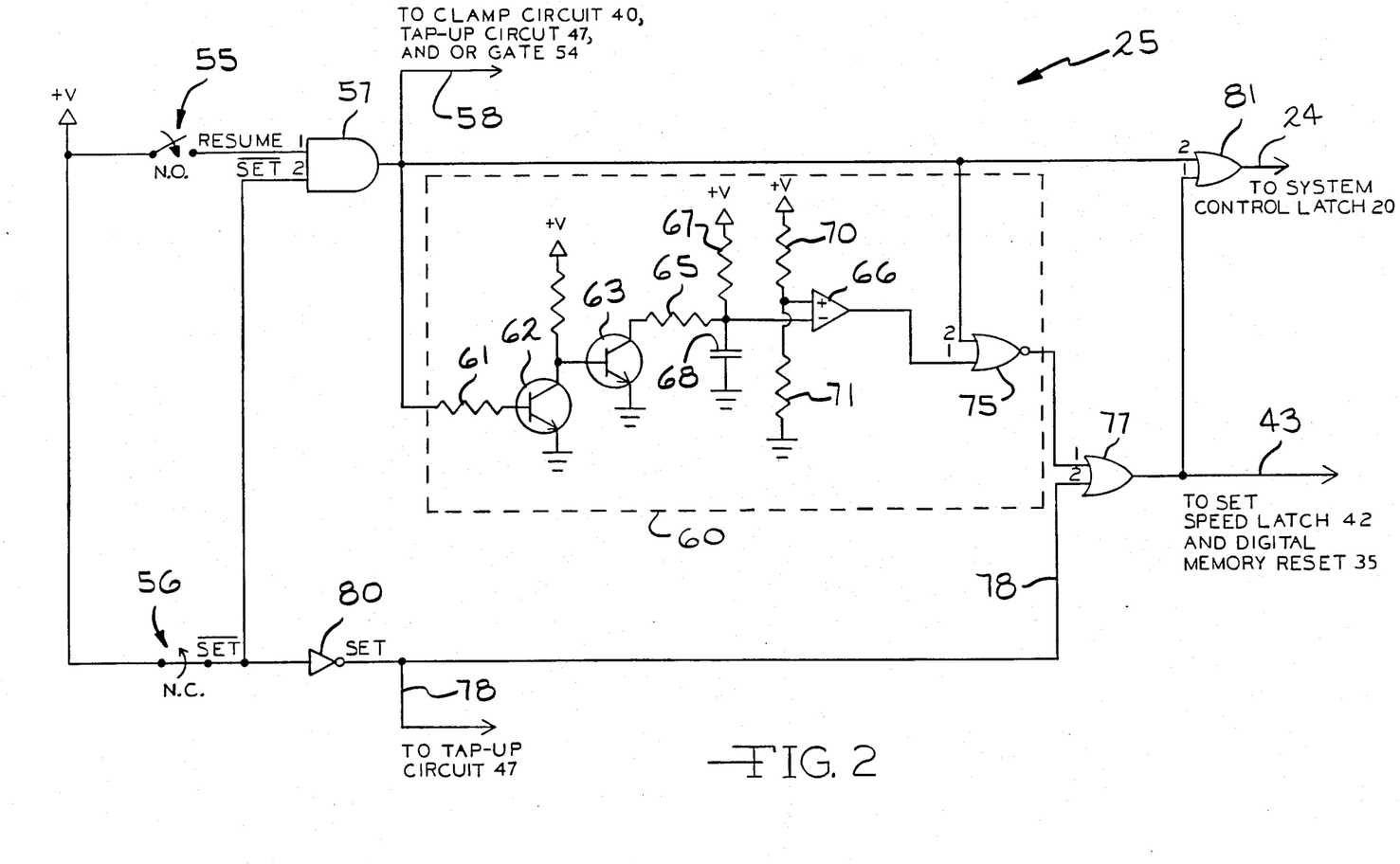
FIG. 2 is a schematic circuit diagram of the set/-resume control circuit of the system illustrated in FIG. 1.

Referring now to FIG. 2, the structure and operation of the set/resume control circuit 25 will be explained in detail. The set/resume control circuit 25 provides an interface between the operator of the vehicle and the electronic vehicle speed control system of the present invention. The set/resume control circuit 25 includes two control switches, indicated generally at 55 and 56, which are manually operable by the vehicle operator to regulate the operation of the system. The first switch 55 will be referred to as the resume switch, while the second switch 56 will be referred to as the set switch. The resume switch 55 can be a normally open single pole, single throw switch connected between a source of positive voltage and a first input of an AND gate 57. The resume switch 55 is manipulated by the vehicle operator from its normally opened position to a closed position when it is desired to actuate the acceleration or resume features of the system, as will be described in detail below. The set switch 56 can be a normally closed single pole, single throw switch connected between the source of positive voltage and a second input to the AND gate 57. The set switch 56 is manipulated by the vehicle operator from its normally closed position to an opened position when it is desired to set the desired speed of the vehicle equal to the actual speed of the vehicle at the time the set switch 56 is opened, as will also be explained in detail below. It will be appreciated that other types of switches than those illustrated may be utilized to form the resume and set switches 55 and 56, respectively.

The output of the AND gate 57 is connected to the output line 58 of the set/resume control circuit 25. The AND gate 57 generates a high output signal on the output line 58 only when the resume switch 55 is manually actuated by the vehicle operator to its closed position while the set switch 56 is not so actuated to remain in its closed position. Under these circumstances, a high output signal is generated on the output line 58 to the clamp circuit 40, the tap-up circuit 47, and the reset circuit 53 (through the OR gate 54). The responses of the clamp circuit 40, the tap-up circuit 47, and the reset circuit 53 to the generation of the high output signal on the output line 58 will be discussed below.

The output line 58 is also connected to the input of a timing circuit 60. The timing circuit 60 is provided to generate a single output pulse having a predetermined duration, but only when the high output signal on the output line 58 is discontinued after having been generated for longer than a predetermined period of time. The timing circuit 60 includes a resistor 61 connected between the base of a transistor 62 and the output line 58. The collector of the transistor 62 is connected to the base of a transistor 63. The transistors 62 and 63 are configured in conventional fashion to act as cascaded inverters, which function to buffer the subsequent portions of the timing circuit 60 from the output line 58. The collector of the transistor 63 is connected through a resistor 65 to the inverting input of an operational amplifier 66. The junction between the resistor 65 and the inverting input of the operational amplifier 66 is connected through a resistor 67 to the source of positive voltage and through a capacitor 68 to ground potential. The non-inverting input of the operational amplifier 66 is connected to the junction between a resistor 70 and a resistor 71, which form a voltage divider between the source of positive voltage and ground potential. The output of the operational amplifier 66 is connected to a first input of a Boolean logic NOR gate 75. A second input of the NOR gate 75 is connected to the output line 58. The structure and function of the NOR gate 75 is well known in the art. The NOR gate 75 generates a high output signal only when both of the inputs thereto are low signals.

The values of the resistors 70 and 71 are selected so as to apply a constant predetermined positive threshold voltage to the non-inverting input of the operational amplifier 66. Typically, the values of the resistors 70 and 71 are selected to be equal, such that the threshold voltage is equal to half of the voltage level generated by the positive voltage source. However, other convenient values may be selected. In any event, the threshold voltage level initially applied to the non-inverting input of the operational amplifier 66 is some positive level. Assuming that the capacitor 68 is initially discharged and the resume switch 55 is in its normally opened position, the voltage level initially applied to the inverting input of the operational amplifier 66 is approximately zero. The resistance of the resistor 67 is selected to be much larger than the resistance of the resistor 65 so as to initially prevent the voltage differential across the capacitor 68 from rising above the threshold level. Thus, the threshold voltage applied to the non-inverting input of the operational amplifier 66 initially exceeds the voltage applied to the inverting input thereof. In this condition, the operational amplifier 66 generates a positive output voltage to the first input of the NOR gate 75.

Consequently, the output from the NOR gate 75 is low, even though a low signal is applied to the second input thereof through the line 58 because of the opened resume switch 55.

When the resume switch 55 is manually operated to its closed position, the AND gate 57 generates a high output signal to the second input of the NOR gate 75. Thus, the output of the NOR gate 75 remains low so long as the resume switch 55 is held in its closed position. The high output signal from the AND gate 57 is also inverted twice through the transistors 62 and 63 of the timing circuit 60. Thus, a high signal is applied through the resistor 65 to the junction between the resistor 67 and the capacitor 68. Since this high signal is a positive voltage, the voltage differential across the capacitor 68 rises upwardly from zero in response thereto. The rate of increase in the voltage differential across the capacitor 68 is determined by the values of the resistor 67 and the capacitor 68. Although any convenient values may be selected, the present description of the invention will assume that the values of the resistor 67 and the capacitor 68 are selected such that it takes approximately one second for the voltage differential across the capacitor 68 to rise upwardly until it equals the threshold level applied to the non-inverting input of the operational amplifier 66 by the resistors 70 and 71.

When the voltage differential across the capacitor 68 rises above the threshold voltage, the output state of the operational amplifier 66 changes from the previous positive voltage to a zero or negative voltage. As a result, the first input of the NOR gate 75 is effectively connected to ground potential. Thus, a low signal is applied to the first input of the NOR gate 75, but only after the resume switch 55 has been closed for longer than one second. Since the resume switch 55 is assumed to remain closed, the second input of the NOR gate 75 receives the high output signal from the AND gate 57 through the output line 58. Consequently, the output state of the NOR gate 75 remains at a low level, even though the voltage differential across the capacitor 68 increases upwardly across the threshold voltage defined by the resistors 70 and 71.

Once the voltage differential across the capacitor 68 (which is applied to the inverting input of the operational amplifier 66) rises above threshold voltage, the re-opening of the resume switch 55 will cause a low signal to be immediately generated from the AND gate 57 to the second input of the NOR gate 75. However, the low signal applied to the first input of the NOR gate 75 is not immediately interrupted when the resume switch 55 is re-opened because the capacitor 68 is unable to instantaneously discharge. Such low input signal will continue so long as the voltage differential across the capacitor 68 remains above the threshold voltage. When the resume switch 55 is opened, the transistor 62 is placed in a non-conductive state, while the transistor 63 is placed in a conductive state. Thus, the resistor 65 is effectively connected to ground potential, and the capacitor 68 will discharge through the resistor 65 and the transistor 63. The rate of decrease in the voltage differential across the capacitor 68 is determined by the values of the resistor 65 and the capacitor 68. Although any convenient values may be selected, it is contemplated that the values of the resistor 65 and the capacitor 68 be selected such that it takes approximately one millisecond for the voltage differential across the capacitor 68 to drop downwardly below the threshold level applied to the non-inverting input of the operational amplifier 66. Thus, the NOR gate 75 will generate a high output pulse having a duration of one millisecond when the resume switch 55 is re-opened, but only after having been closed for longer than one second.

From the above description, it can be seen that the NOR gate 75 will generate a one millisecond high output signal only when the resume switch 55 is released after having been closed for at least one second. If the resume switch 55 is closed and subsequently re-opened before one second has passed, the voltage differential across the capacitor 68 will not increase past the threshold, and the output state of the operational amplifier 66 will not change from high to low. Consequently, the signal from the operational amplifier 66 applied to the first input of the NOR gate 75 will always remain high, thereby maintaining the output state of the NOR gate 75 low. However, if the resume switch 55 is closed for longer than the one second predetermined period of time, the voltage differential across the capacitor 68 to increase above the threshold voltage. Consequently, the output state of the operational amplifier 66 will change from high to low, causing the operational amplifier 66 to generate a low signal to the first input of the NOR gate 75, thereby permitting the one millisecond high output signal to be generated as described above.

The output from the NOR gate 75 is connected to a first input of an OR gate 77. The second input of the OR gate 77 is connected to the output line 78. The set switch 56 is connected through an inverter 80 to the output line 78. The output line 78 is also connected to one input of the tap-up circuit 47, as will be described below. The output of the OR gate 77 is connected to the output line 43 which, in turn, is connected to the reset input of the set speed latch 42 and to the reset input of the digital memory circuit 35. The output line 43 is also connected to a first input of an OR gate 81. A second input of the OR gate 81 is connected to the output line 58. The output of the OR gate 81 is connected to the output line 24 which, in turn, is connected through the second input of the AND gate 23 to the system control latch 20.

In operation, the set/resume control circuit 25 immediately generates a high output signal on each of the output lines 24 and 58 when the resume switch 55 is moved to its closed position. If the resume switch 55 is returned to its opened position after having been closed for less than one second, the only action of the set/resume control circuit 25 is to discontinue the high output signals on the output lines 24 and 58. If the resume switch 55 is returned to its opened position after having been closed for longer than one second, the high output signals on the output lines 24 and 58 will be discontinued, but also a one millisecond high output signal will be generated on the output lines 24 and 43. On the other hand, if the set switch 56 is moved to its opened position, a high output signal will be immediately generated on each of the output lines 24, 43, and 78. Such high output signals will be discontinued immediately when the set switch 56 is returned to its closed position.

The Analog And Digital Memory Circuits 35 And 37

Figure 3:
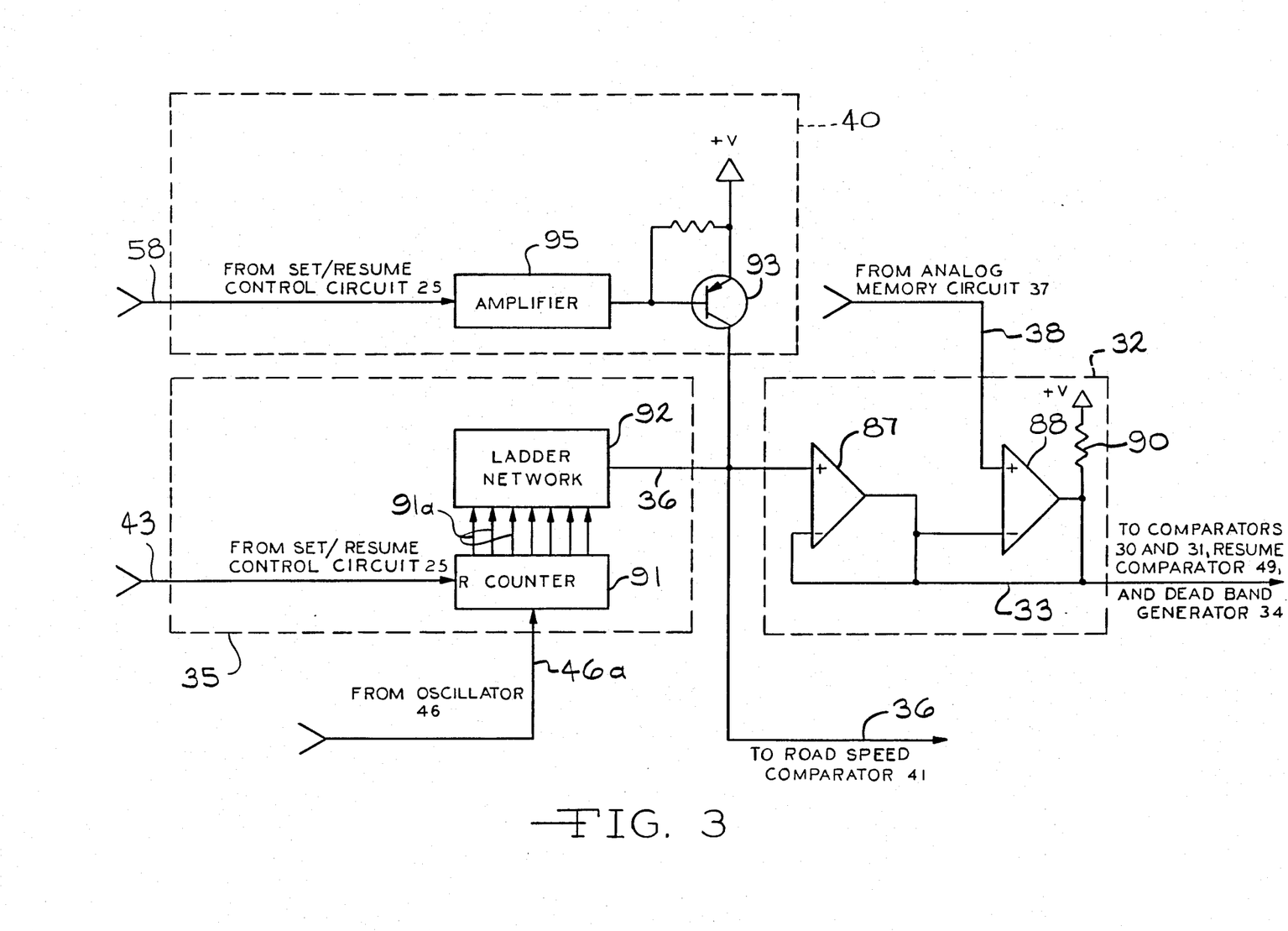
FIG. 3 is a schematic circuit diagram of the digital memory circuit, the memory buffer circuit, and the clamp circuit of the system illustrated in FIG. 1.

Referring now to FIG. 3, the structure and operation of the memory buffer circuit 32, the digital memory circuit 35, and the clamp circuit 40 will be explained in detail. The memory buffer circuit 32 is formed by a pair of operational amplifiers 87 and 88. The non-inverting input of the first operational amplifier 87 is connected to the output line 36 of the digital memory circuit 35, while the non-inverting input of the second operational amplifier 88 is connected to the output line 38 of the analog memory circuit 37. Both of the inverting inputs and both of the outputs of the operational amplifiers 87 and 88 are connected to the output line 33 of the memory buffer circuit 32. The output line 33 is also connected through a resistor 90 to the source of positive voltage. In operation, the outputs of the operational amplifiers 87 and 88, and hence the output of the memory buffer 32 on the line 33, will be an analog voltage which is equal to the lesser of the analog voltages applied to the non-inverting inputs of the operational amplifiers 87 and 88. This occurs because of the use of the illustrated output configuration, wherein the combination of the resistor 90 and the positive voltage source actively pulls up the output voltage level of the memory buffer circuit 32 to the levels established by the operational amplifiers 87 and 88. Because the operational amplifiers 87 and 88 are equally capable of establishing an output level, and further because the outputs of the operational amplifiers 87 and 88 are connected together, it follows that the lesser of the two outputs of the operational amplifiers 87 and 88, as determined by the respective inputs thereto, will control the overall output of the memory buffer circuit 32. Therefore, as mentioned above, the output of the memory buffer circuit 32 is an analog electrical signal which is equal to the lesser positive voltage of the outputs of the digital and analog memory circuits 35 and 37, respectively, which are applied to the non-inverting inputs of the operational amplifiers 87 and 88.

The analog memory circuit 37 can include a capacitor (not shown), as is well known in prior art electronic speed control systems. Such capacitor is capable of maintaining a voltage differential thereacross for extended periods of time, which voltage differential is representative of the desired speed of the vehicle. To change the desired speed of the vehicle, the capacitor is selectively charged and discharged. When the charge across the capacitor is increased, the desired speed signal generated thereby is increased, and vice versa. The digital memory circuit 35, on the other hand, includes a digital counter 91 and a ladder network 92. The counter 91 is a conventional device which generates and stores a binary number therein. The value of the binary number is representative of the desired speed of the vehicle. To increase the desired speed signal generated by the digital memory circuit 35, the binary number stored in the counter 91 is increased. The counter 91 is responsive to the high output signals generated by the oscillator circuit 46 and the tap-up circuit 47 over the line 46a, as described below, for incrementing the value of the binary number stored in the counter 91 upwardly. The counter 91 generates output signals representing the binary number stored therein on a plurality of output lines 91a. The output lines 91a are connected to a plurality of inputs of the ladder network 92, which is also conventional in the art. The ladder network 92 is responsive to the binary number generated by the counter 91 for generating a analog electrical signal on the output line 36 which is proportional thereto. Thus, the digital memory circuit 35 converts the digital desired speed signal contained in the counter 91 to an analog electrical signal before it is fed to the memory buffer circuit 32. The counter 91 is also responsive to a high output signal generated on the output line 43 from the set/resume control circuit 25 for resetting the value of the binary number stored therein to zero.

The clamp circuit 40 has an output which is connected to the output line 36 between the digital memory circuit 35 and the memory buffer 32. The clamp circuit 40 includes a transistor switch 93 which is connected between the line 36 and the source of positive voltage. The operation of the transistor switch 93 is controlled by the set/resume circuit 25, which is connected thereto by the output line 58 through a conventional amplifier 95. When a high output signal is generated by the set/resume circuit 25 on the output line 58, the transistor switch 93 effectively connects the output line 36 of the digital memory circuit 35 directly to the source of positive voltage. When this occurs, the output of the digital memory circuit 35 is clamped to a high voltage. Since the memory buffer 32 passes only the lower of the voltages from the memory circuits 35 and 37, the activation of the clamp circuit 40 prevents the digital memory circuit 35 from providing the desired speed signal to the comparators 30 and 31. The reason for disabling the digital memory circuit 35 in this manner will be explained in detail below. When the clamp circuit 40 is not activated in this manner, the transistor switch 93 effectively disconnects the output line 36 from the source of positive voltage. Thus, the digital memory circuit 35 is permitted to generate its output signal on the line 36 as described above.

The Tap-Up Circuit 47

Figure 4:
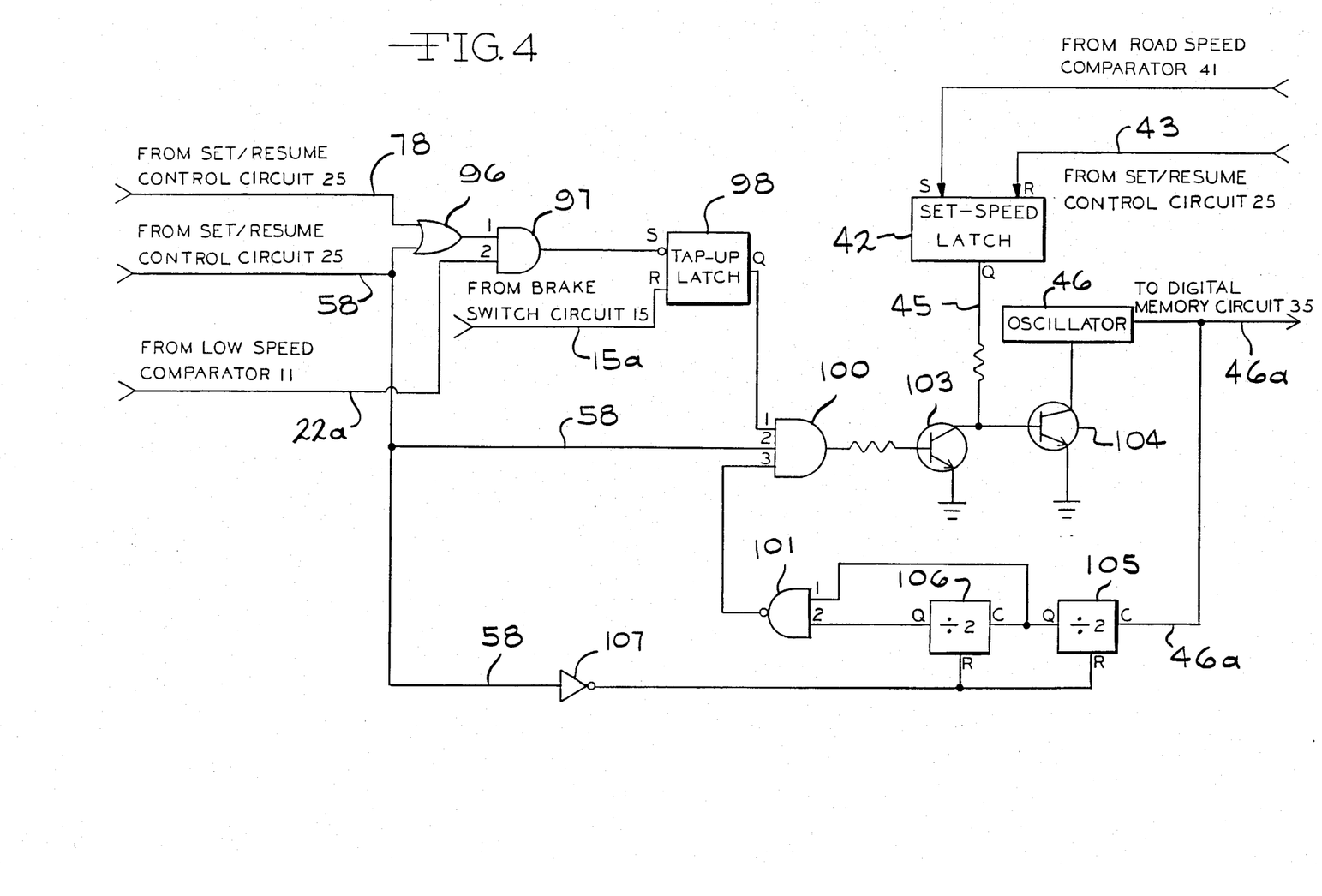
FIG. 4 is a schematic circuit diagram of the tap-up circuit of the system illustrated in FIG. 1.

Referring now to FIG. 4, the structure and operation of the tap-up circuit 47 will be explained in detail. The output lines 58 and 78 from the from the set/resume control circuit 25 are connected to the two inputs of an OR gate 96. The output of the OR gate 96 is connected to a first input of an AND gate 97. A second input of the AND gate 97 is connected to the output line 22a of the inverter 22. As previously discussed, the input of the inverter 22 is connected to the output of the low speed comparator 11. Consequently, a high output signal is generated on the line 22a so long as the actual speed of the vehicle is greater than the predetermined minimum speed, as determined by the underspeed reference generator 12. The output of the AND gate 97 is connected to the set input of a tap-up latch 98. The set input of the tap-up latch 98 is configured in a known manner to be responsive only to the negative or trailing edge of the high output signal of the AND gate 97 for triggering a response from the tap-up latch 98. The reset input of the tap-up latch 98 is connected to the output line 15a from the brake switch circuit 15. The output of the tap-up latch 98 is connected to a first input of an AND gate 100. A second input of the AND gate 100 is connected to the output line 58 from the set/resume control circuit 25. A third input to the AND gate 100 is connected to the output of a Boolean logic NAND gate 101, whose function will be described in detail below.

The output from the AND gate 100 is connected to the base of a transistor 103. The collector of the transistor 103 is connected to the line 45 between the output of the set speed latch 42 and the oscillator 46. Specifically, the line 45 and the collector of the transistor 103 are connected to the base of a transistor 104. The collector of the transistor 104 is connected to an enable input of the oscillator 46, as will be described below. The emitters of both the transistors 103 and 104 are connected to ground potential. The output line 46a of the oscillator circuit 46, which is connected to the count input of the counter 91 within the digital memory circuit 35, is also connected to the count input of a first divide-by-two counter 105. The output of the first divide-by-two counter 105 is connected to the count input of a second divide-by-two counter 106 and further to a first input of the NAND gate 101. The output of the second divide-by-two counter 106 is connected to a second input of the NAND gate 101. The reset inputs of the first and second divide-by-two counters 105 and 106, respectively, are both connected to the output of an inverter 107. The input of the inverter 107 is connected to the output line 58 of the set/resume control circuit 25.

In operation, the signals on the output lines 58 and 78 are initially low, since it is assumed that neither the resume switch 55 nor the set switch 56 has been actuated by the operator of the vehicle. It is further assumed that the output state of the tap-up latch 98 is also low, thus placing the transistor 103 in a non-conductive state. Consequently, the transistor 103 has no control over the operating condition of the transistor 104. Thus, the operating condition of the transistor 104 is controlled solely by the output state of the set speed latch 42. When the output signal from the set speed latch 42 is high, the transistor 104 is placed in a conductive state. As a result, the oscillator 46 is disabled, thereby preventing pulses from being generated to the counter 91. When the output state of the set speed latch 42 is low, the transistor 104 is placed in a non-conductive state. As a result, the oscillator 46 is enabled, thereby causing pulses to be generated to the counter 91 and to the first divide-by-two counter 105.

Additionally, since the output signal on the line 58 is initially low, the output signal of the inverter 107 is high. Consequently, the divide-by-two counters 105 and 106 are reset to zero, and their outputs generate low signals to the inputs of the NAND gate 101. Accordingly, the divide-by-two counters 105 and 106 are not responsive to the generation of the high output pulses on the line 46a. In response to the low output signals from the divide-by-two counters 105 and 106, the NAND gate 101 generates a high output signal to the third input of the AND gate 100. Thus, the input signal to the third input of the AND gate 100 is high, while the input signals to the first and second inputs of the AND gate 100 remain low. This is the initial operating condition of the tap-up circuit 47, which is maintained until one of the switches 55 or 56 is actuated as described below.

When either the resume switch 55 or the set switch 56 is initially moved from its normal position by the vehicle operator, a high output signal is generated on one of the output lines 58 or 78. In response thereto, the OR gate 96 generates a high output signal to the first input of the AND gate 97. Assuming that the signal applied to the second input of the AND gate 97 through the line 22a is also high, the AND gate 97 generates a high output signal to the set input of the tap-up latch 98. Such high output signal from the AND gate 97 continues as long as a high output signal is generated on either of the output lines 58 or 78. When the initially-moved resume switch 55 or set switch 56 is subsequently released, causing the high output signal from the AND gate 97 to be discontinued, the tap-up latch 98 generates a high output signal to the first input of the AND gate 100. Such high output signal of the tap-up latch 98 is maintained until a high output signal is generated on the output line 15a to the reset input of the tap-up latch 98. Thus, the tap-up latch 98 generates and holds high output signal when the tap-up circuit 47 is enabled for operation by the initial movement and release of either the resume switch 55 or the set switch 56. When this occurs, the input signals to the first and third inputs of the AND gate 100 are high, while the input signal to the second input of the AND gate 100 remains low. This is the stand-by operating condition of the tap-up circuit 47, which continues until the resume switch 55 is subsequently actuated as described below.

Following such initial enabling of the tap-up circuit 47, the acceleration feature of the tap-up circuit 47 can be actuated by moving the resume switch 55 to its closed position. As a result, a high output signal is generated on the line 58 to the second input of the AND gate 100 and to the input of the inverter 107. In response thereto, the AND gate 100 generates a high output signal to the transistor 103, since the input signals to the first and third inputs of the AND gate 100 were already high. The high output signal of the AND gate 100 causes the transistor 103 to be placed in a conductive state. Consequently, the transistor 104 is placed in a non-conductive state, thereby activating the oscillator 46 to generate pulses on the output line 46a to the counter 91 and to the first divide-by-two counter 105. Since the input signal of the inverter 107 goes high when the resume switch 55 is closed, the output signal of the inverter 107 goes low. Accordingly, both of the divide-by-two counters 105 and 106 are released from their reset condition and begin to count the pulses generated by the oscillator 46 on the line 46a.

Assuming for the moment that the oscillator 46 is generating such output pulses, the counter 91 and the divide-by-two counters 105 and 106 begin to accumulate such pulses. After three pulses have been generated by the oscillator 46, both of the outputs of the divide-by-two counters 105 and 106 generate high output signals to the inputs of the NAND gate 101. In response thereto, the output signal of the NAND gate 101 goes low, causing the output signal of the AND gate 100 to go low also. The low output signal from the AND gate 100 places the transistor 103 in a non-conductive state, which places the transistor 104 in a conductive state. Therefore, the oscillator 46 is disabled from generating additional pulses on the output line 46a. At this point, the input signals to the first and second inputs of the AND gate 100 remain high, while the input signal to the third input thereto has changed to low. This is the post-operative condition of the tap-up circuit, which continues until the resume switch 55 is released.

Once the acceleration feature of the tap-up circuit 47 has been operated in the manner described above, subsequent operation of the acceleration feature is prevented until the resume switch 55 is returned to its original opened position. When this occurs, a low output signal is again applied to the second input of the AND gate 100 and to the input of the inverter 107. As described above, the inverter 107 resets the outputs of both of the divide-by-two counters 105 and 106 to zero, thereby causing the NAND gate 101 to generate a high output signal to the third input of the AND gate 100. The tap-up circuit 47 is thereby returned to its stand-by operating condition, wherein the first and third inputs of the AND gate 100 are high, while the second input thereto is low. Accordingly, the tap-up circuit 47 is thus prepared for subsequent re-activation.

The above-described acceleration feature, namely, the automatic incrementing of the counter 91 by three, of the tap-up circuit 47 occurs only the if tap-up circuit 47 is in the stand-by operating condition described above when the resume switch 55 is closed. In other words, the tap-up latch 98 must be set to its high output state before the resume switch 55 is closed for the acceleration feature to operate. If the tap-up circuit 47 is only in its initial operating condition, the closing of the resume switch 55 will only serve to place the tap-up circuit 47 in its stand-by operating condition, as described above. As will be explained in greater detail below, the closing of the resume switch 55 when the tap-up circuit 47 is in its initial operating condition can cause one of two system reactions to occur. First, if the resume switch 55 is opened after being closed for less than the one second predetermined period of time, a normal resume feature will occur. In other words, the actual speed of the vehicle will be returned to the prior set desired speed. Second, if the resume switch 55 is opened after being closed for longer than one second, a modified resume feature will occur. In this situation, the prior set desired speed replaced with a new desired speed, which is equal to the actual speed of the vehicle when the resume switch 55 is opened. Thus, the modified resume feature returns the actual speed of the vehicle to the newly set desired speed.

However, assuming that the tap-up circuit 47 is in its stand-by operating condition when the resume switch 55 is closed, the acceleration feature described above will be performed regardless of whether the resume switch 55 is closed for longer or shorter than one second. As will be discussed below, however, the above-described sequence of operations is effectively ignored by the system when the resume switch 55 is released after having been closed for longer than one second. Thus, the acceleration feature of the system is implemented only when the tap-up circuit 47 is in its stand-by operating condition when the resume switch 55 is opened after having been closed for less than one second.

From the above description, it will be appreciated that the actuation of the tap-up circuit 47 causes the oscillator 46 to generate three output pulses to the counter 91 when the resume switch 55 is closed. By incrementing the counter 91 in this fashion, the desired speed signal stored in the digital memory circuit 35 is increased by a predetermined amount. Such action occurs each time the acceleration feature is operated in the manner described above. As mentioned above, the incrementing of the counter 91 by three pulses can be related to a predetermined increase of one mile per hour in the desired speed signal stored in the digital memory circuit 35. However, it will be appreciated that other conventional circuits may be utilized such that the acceleration feature increments the number stored in the counter 91 by more or less than three, or that an increase by three relates to some other predetermined change in the desired speed signal.

Normal Operation Of The System

Referring now to FIGS. 1 through 4, the operation of the system will be explained in detail. To engage the system for normal operation, the set switch 56 is manually moved to its opened position by the vehicle operator. In response thereto, high output signals are generated on each of the output lines 24, 43, and 78. As shown in FIG. 1, the output line 24 is connected to the second input of the AND gate 23. Assuming that the actual speed of the vehicle is greater than the minimum speed predetermined by the underspeed reference generator 12, a high output signal is generated from the AND gate 23 to the set input of the system control latch 20. In response thereto, the system control latch 20 generates and holds a high output signal on the output line 26. The vent valve solenoid circuit 27 and the charge valve solenoid circuit 28 are thereby enabled for operation. Additionally, the reset circuit 53 is actuated so as to clear the value of the desired speed signal stored in the analog memory circuit 37 to zero. The reset circuit 53 is a triggered device which is only momentarily active. As a result, the analog memory circuit 37 is cleared to zero but is not held at zero thereafter. As will be explained in greater detail below, the value of the desired speed signal stored in the analog memory circuit 37 is subsequently rapidly raised to a value which is equal to the current actual speed of the vehicle.

The high output signal on the output line 43 resets the set speed latch 42 such that a low output signal is generated therefrom to the oscillator 46. As shown in FIG. 4, the low output signal from the set speed latch 42 places the transistor 104 in a non-conductive state, thereby permitting the oscillator 46 to generate pulses to the counter 91 and to the first divide-by-two counter 105. However, the high output signal on the line 43 also resets the counter 91 to zero and holds the count stored therein at zero so long as it is generated (i.e., so long as the set switch 56 is held in its opened position). Thus, the pulses generated by the enabled oscillator 46 are initially ignored by the counter 91. Lastly, as shown in FIG. 4, the high output signal on the output line 78 causes a high signal to be applied to the set input of the tap-up latch 98. However, since the tap-up latch 98 is initially assumed to have a low output state, the tap-up circuit 47 remains in its initial operating condition.

When the set switch 56 is subsequently released to its closed position, each of the high output signals on the output lines 24, 43, and 78 is immediately discontinued. As a result, the counter 91 is enabled to begin accumulating the number of pulses generated by the oscillator 46. As such pulses are accumulated, the magnitude of the desired speed signal on the output line 36 from the digital memory circuit 35 increases. The desired speed signal will continue to increase until the value thereof exceeds the value of the actual speed of the vehicle. At that time, the road speed comparator 41 generates a high output signal to the set input of the set speed latch 42. In response thereto, the output of the set speed latch 42 generates a high output signal. Referring again to FIG. 4, the high output signal from the set speed latch 42 places the transistor 104 in a conductive state, thereby disabling the oscillator 46. Thus, the count stored in the counter 91, which represents the desired speed signal of the vehicle, is maintained at a value which is equivalent to the actual speed of the vehicle at the time the set switch 56 was released. That count is stored in the counter 91 for normal cruise operation of the system. Also, the release of the set switch 56 causes the tap-up circuit 47 to be placed in its stand-by operating state, as described above.

As the above sequence of events occurs in the digital memory circuit 35, the analog memory circuit 37 reacts simultaneously to the opening of the set switch 56. As mentioned above, the reset circuit 53 initially causes the value of the desired speed signal stored in the analog memory circuit 37 to be cleared to zero upon the opening of the set switch 56. Once cleared to zero, however, the value of the desired speed signal stored in the analog memory circuit 37 is rapidly increased by the current generator 51. This occurs because the resume comparator 49 generates a high output signal to the high current switch 50 in response to its determination that the actual speed of the vehicle (from the road speed sensing circuit 10) is greater than the desired speed of the vehicle (from the memory buffer 32). The activation of the high current switch 50 causes the current generator 51 to rapidly increase the value of the desired speed signal stored in the analog memory circuit 37. The rapid increase in the value of the desired speed signal stored in the analog memory circuit 37 is discontinued when the actual speed of the vehicle equals the desired speed. At that time, the output of the resume comparator 49 changes to a low state, thereby de-activating the high current switch 50. The current generator 51, however, continues to increase the value of the desired speed signal stored in the analog memory circuit 37 at the slower rate discussed above. Since the analog memory desired speed signal is greater than the digital memory desired speed signal at this point, such further increase of the analog memory desired speed signal has no effect on the normal cruise operation of the system.

Thus, during normal operation of the system, the digital memory 35 stores a number representing the desired speed of the vehicle and generates an analog electrical signal proportional thereto to the comparators 30 and 31. During such periods of normal operation, as well as at other times, the system may encounter conditions which will cause it to be disengaged from the control of the vehicle speed. One of these conditions may be the actuation of the brakes of the vehicle by the operator When this occurs, the brake switch circuit 15 generates a high output signal as described above to the reset input of the system control latch 20. In response thereto, the output state of the system control latch 20 is changed to low, thereby disabling the solenoid circuits 27 and 28. Consequently, the system releases its control over the speed of the vehicle. Another one of these conditions may be an overspeed condition of the vehicle engine, such as might occur when the system is engaged while the vehicle is in neutral. The engine speed sensing circuit 13 generates a high output signal to the reset input of the system control latch 20 when this occurs, thereby disabling the solenoid circuits 27 and 28. A further one of these conditions may be an underspeed condition of the vehicle. The low speed comparator 11 generates a high output signal to the reset input of the system control latch 20 when this occurs, thereby disabling the solenoid circuits 27 and 28. It should be noted that the occurrence of any one of these conditions will also prevent the system from initially being engaged for operation if they occur when the set switch 56 is manipulated as described above. It should also be noted that the generation of the high output signal from the brake switch circuit 15 causes the tap-up circuit 47 to be placed back in its initial operating condition, as described above.

The Resume Feature

If the system has been engaged for normal operation and subsequently disengaged for some reason, the vehicle operator may wish to resume engagement of the system at the desired speed which was previously set. To accomplish this, the operator manipulates the resume switch 55 illustrated in FIG. 2 to its closed position and then releases it less than one second later. When the resume switch 55 is initially closed, high output signals are immediately generated on the output lines 24 and 58 of the set/resume control circuit 25, as described above. The high output signal on the output line 24 sets the output state of the system control latch 20 high, as previously discussed. The high output signal on the output line 58 causes three reactions within the system. First, the tap-up circuit 47 is returned to its stand-by operating condition, but only when the resume switch 55 is subsequently closed, as mentioned above. Second, the analog memory circuit 37 is reset to zero by the reset circuit 53 and the OR gate 54. Third, the clamp circuit 40 is activated to raise the magnitude of the signal on the output line 36 up to the level of the positive voltage source, even though the number stored in the counter 91 remains at the prior set desired speed. Such clamping action is performed to insure that the digital memory desired speed signal is greater than the analog memory speed signal during the initial portion of the resume feature and, therefore, has no effect thereon.

After being reset to zero, the output signal of analog memory circuit 37 rapidly increases until it equals the value of the current actual speed of the vehicle, in the manner discussed above. Thereafter, the output signal continues to rise at the slower rate. So long as the value of the analog memory circuit output signal is less than the digital memory circuit output signal, it will be fed through the memory buffer circuit 32 to the comparators 30 and 31. Of course, as long as the resume switch 55 is held closed, the clamp circuit 40 will maintain the digital memory circuit output signal at the high level. When the resume switch 55 is re-opened, the magnitude of the signal on the line 36 will return back to the prior set desired speed stored in the counter 91. If the actual speed of the vehicle happens to be greater than the desired speed signal generated by the digital memory circuit 35 when the resume switch 55 is released, the vehicle will coast back down to the desired speed. Assuming, however, that the actual speed of the vehicle is less than the desired speed signal generated by the digital memory circuit 35 when the resume switch 55 is released, as is usually the case, the comparators 30 and 31 will cause the actual speed of the vehicle to increase up to the value of the desired speed signal generated by the analog memory circuit 37. Simultaneously, however, the value of the desired speed signal generated by the analog memory circuit 37 is gradually increased at the slower rate by the current generator 51. Thus, the rate of acceleration of the actual speed of the vehicle is controlled by the slower rate of increase of the value of the desired speed signal generated by the analog memory circuit 37.

The value of the desired speed signal generated by the analog memory circuit 37 continues to increase past the value of the desired speed signal generated by the digital memory circuit 35, which represents the previously set desired speed. Once the value of the desired speed signal generated by the analog memory circuit 37 becomes greater than the value of the desired speed signal generated by the digital memory circuit 35, however, the memory buffer 32 ceases to feed it to the comparators 30 and 31. Thus, the comparators 30 and 31 will raise the actual speed of the vehicle up to the previously set desired speed and maintain it there for normal operation of the system. Once the actual speed of the vehicle is returned to the previously set desired speed, the resume feature is completed, and the system is re-engaged for normal operation.

The above discussion of the resume feature assumes that the resume switch 55 is re-opened after being closed for less than one second. If the resume switch 55 is held in its closed position for longer than one second, the same reactions described above will occur. However, additionally, the timing circuit 60 will cause a short high output signal to be generated on the output lines 24 and 43 of the set/resume control circuit 25 upon the release of the resume switch 55. The high output signal on the output line 24 duplicates the same operation described above. The high output signal on the output line 43 duplicates the activation of the set switch 56, also as described above. Consequently, the resume feature is activated, but the previously set desired speed stored in the counter 91 is erased and replaced by a new desired speed, which is equal to the actual speed of the vehicle when the resume switch 55 is released. Since the actual speed of the vehicle, then, is already approximately equal to the desired speed, the resume feature will only be active for a very short time. Thereafter, the system is re-engaged for normal operation of maintaining the actual speed of the vehicle at or near the newly set desired speed.

The Acceleration Feature

If the system is currently engaged for normal operation, the vehicle operator may wish to slightly increase the desired speed of the vehicle and maintain it at that accelerated speed. To accomplish this, the operator manipulates the resume switch 55 illustrated in FIG. 2 to its closed position and then releases it less than one second later. When the resume switch 55 is initially closed, high output signals are generated on the output lines 24 and 58 of the set/resume control circuit 25, as discussed above. The high output signals on the output lines 24 and 58 cause the same system reaction described above. Additionally, however, since the system is already engaged for operation, the tap-up latch 98 of the tap-up circuit 47 is already maintaining a high output signal to the first input of the AND gage 100. Thus, the tap-up circuit 47 is in its stand-by operating condition when the resume switch 55 is initially closed. As a result, the tap-up circuit 47 operates to increase the count stored in the counter 91 by three in the manner described above. In response thereto, the desired speed signal generated by the digital memory circuit 35 will be increased by the predetermined small amount.

As mentioned above, the closing of the resume switch 55 causes the clamp circuit 40 to raise the value of the output signal on the output line 36 at a high level. Thus, even though the count stored in the counter 91 is increased by only three, the digital memory circuit 35 is prevented from having any effect on the output signal from the memory buffer 32. Therefore, while the resume switch 55 is closed, the analog memory circuit 37 supplies the desired speed signal through the memory buffer 32 to the comparators 30 and 31. Once the resume switch 55 is returned to its opened position, the clamp circuit 40 is de-activated, thereby permitting the incremented desired speed signal from the digital memory circuit 35 to be fed through the memory buffer 32 to the comparators 30 and 31. In response thereto, the comparators 30 and 31 will slightly increase the actual speed of the vehicle by the predetermined small increase in the desired speed signal.

The above discussion of the acceleration feature assumes that the resume switch 55 is re-opened after being closed for less than one second. If the resume switch 55 is held in its closed position for longer than one second, the same reactions described above will occur. However, additionally, the timing circuit will cause a short high output signal to be generated on the output lines 24 and 43 of the set/resume control circuit upon the release of the resume switch 55. The high output signal on the output line 24 duplicates the same operation described above. The high output signal on the output line 43 duplicates the activation of the set switch 56, also as described above. Consequently, the acceleration feature is activated, but the previously set desired speed stored in the counter 91 is erased and replaced by a new desired speed, which is equal to the actual speed of the vehicle when the resume switch 55 is released. As mentioned above, the analog memory circuit 37 supplies the desired speed signal to the comparators 30 and 31 while the resume switch 55 is closed. After the value of the desired speed signal stored in the analog memory circuit 37 is rapidly increased to equal the actual speed of the vehicle, the current generator 51 continues to increase the value of such desired speed signal at the slower predetermined rate. Thus, so long as the resume switch 55 is maintained in its closed position, the actual speed of the vehicle will be increased in response to the increasing desired speed signal generated by the analog memory circuit 37. When the resume switch 55 is released, the high output signal on the output line 43 causes the value of the desired speed signal stored in the digital memory circuit 35 to be reset equal to the current (faster) speed of the vehicle. Thereafter, the system is re-engaged for normal operation of maintaining the actual speed of the vehicle at or near the faster desired speed.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

What is claimed is:

1. In an electronic vehicle speed control system including means for generating a signal representing the actual speed of the vehicle and comparison means for comparing the actual speed signal with a signal representing the desired speed of the vehicle so as to control the actual speed of the vehicle in accordance with the desired speed, a means for generating the desired speed signal comprising:
   first and second memory circuits for storing and generating first and second memory signals, respectively; and
   memory buffer means including first and second operational amplifiers, a first input of said first operational amplifier being connected to receive said first memory signal, a first input of said second operational amplifier being connected to receive said second memory signal, and second inputs of both said first and second operational amplifiers being connected to outputs of both of said first and second operational amplifiers and to an output line, whereby a signal is generated on the output line which is equal in value to one of said first and second memory signals as said desired speed signal.

2. The invention defined in claim 1 wherein said first inputs of said first and second operational amplifiers are non-inverting inputs and said second inputs of said first and second operational amplifiers are inverting inputs.

3. The invention defined in claim 1 further including a source of electrical voltage and a resistor connected between said source of electrical voltage and said output line of said memory buffer means.

4. In an electronic vehicle speed control system including means for generating a signal representing the actual speed of the vehicle and comparison means for comparing the actual speed signal with a signal representing the desired speed of the vehicle so as to control the actual speed of the vehicle in accordance with the desired speed, a means for generating the desired speed signal comprising:
   memory circuit means for storing and generating the desired speed signal;
   means connected to said memory circuit means for selectively increasing the value of the desired speed signal at a first predetermined rate; and
   means responsive to the actual speed signal and the current desired speed signal for causing said means for selectively increasing to increase the value of the desired speed signal at a second predetermined rate when the actual speed signal is greater than the current desired speed signal, said second predetermined rate being greater than said first predetermined rate.

5. The invention defined in claim 4 wherein said memory circuit means includes an analog memory means for generating an analog electrical signal which is representative of the desired speed signal.

6. The invention defined in claim 5 wherein said means for increasing includes a current generator for supplying electrical current to said analog memory means to increase the value of the desired speed signal at said first predetermined rate.

7. The invention defined in claim 6 further including means for selectively disabling said current generator to prevent it from supplying electrical current to said analog memory circuit.

8. The invention defined in claim 6 further including means for selectively resetting the magnitude of the analog electrical signal generated by said analog memory circuit to zero.

9. The invention defined in claim 8 further including means for generating a set speed signal to set the desired speed signal equal to the current actual speed of the vehicle, said means for selectively resetting being responsive to said set speed signal for resetting the magnitude of said electrical voltage maintained in said analog memory circuit to zero.

10. The invention defined in claim 4 further including means for selectively disabling said means for selectively increasing to prevent said means for selectively increasing from increasing the value of the desired speed signal.

11. The invention defined in claim 10 wherein the vehicle includes a throttle and the speed control system further includes means for generating a signal representing the position of said throttle, means for generating a signal representing a predetermined maximum position of said throttle, and means responsive to said throttle position signal and said maximum throttle position signal for generating a disabling signal when said throttle position signal is greater than said maximum throttle position signal, said means for selectively disabling being responsive to said disabling signal for preventing said means for increasing from increasing the value of the desired speed signal.

12. In an electronic vehicle speed control system including means for generating a signal representing the actual speed of the vehicle and comparison means for comparing the actual speed signal with a signal representing the desired speed of the vehicle so as to control the actual speed of the vehicle in accordance with the desired speed, a digital memory means for generating the desired speed signal comprising:

counter means for generating a plurality of digital electrical signals which are representative of the desired speed;

oscillator means connected to said counter means for selectively incrementing said counter means to increase the value of the desired speed signal;

means for selectively generating a disabling signal to said oscillator means to prevent it from incrementing said counter means; and means for selectively interrupting said disabling signal to said oscillator means to permit said oscillator means to increment said counter means by a predetermined amount before restoring said disabling signal to said oscillator means.

13. The invention defined in claim 12 wherein said digital memory circuit further includes means for converting said plurality of digital electrical signals to an analog electrical signal which is representative of the desired speed signal.

14. The invention defined in claim 12 wherein said means for generating said disabling signal is responsive to the desired speed signal and the actual speed signal for generating said disabling signal when the desired speed signal is greater than the actual speed signal.

15. The invention defined in claim 14 wherein said disabling signal is continued once it has been generated and further including means for selectively discontinuing said disabling signal.

16. The invention defined in claim 15 further including means for generating a set speed signal to set the desired speed signal to a value which is representative of the current actual speed of the vehicle, said means for selectively discontinuing said disabling signal being responsive to said set speed signal for discontinuing said disabling signal to permit said oscillator means to increment said counter means.

17. The invention defined in claim 13 wherein said means for selectively interrupting includes transistor means, said transistor means being connected to ground potential and to a line extending from said means for generating said disabling signal to said oscillator means, and means for selectively energizing said transistor means to connect said line to ground potential, thereby preventing said disabling signal from being transmitted to said oscillator means.

18. The invention defined in claim 17 wherein said means for selectively energizing includes means responsive to said oscillator means for generating a signal when said oscillator means has generated a predetermined number of signals to increment said counter means by said predetermined amount.

* * * * *

UNITED STATES PATENT AND TRADEMARK OFFICE
CERTIFICATE OF CORRECTION

PATENT NO. : 4,855,918
DATED : August 8, 1989
INVENTOR(S) : Larry O. Gray

It is certified that error appears in the above-identified patent and that said Letters Patent is hereby corrected as shown below:

Column 22, line 17, "current desired" should be -- stored desired --.

Column 22, line 21, "current desired" should be -- stored desired --.

Signed and Sealed this

Fifth Day of June, 1990

Attest:

HARRY F. MANBECK, JR.

Attesting Officer  Commissioner of Patents and Trademarks